(12) United States Patent
Diggins

(10) Patent No.: US 8,964,837 B2
(45) Date of Patent: Feb. 24, 2015

(54) REGIONAL FILM CADENCE DETECTION

(75) Inventor: Jonathan Diggins, Eastleigh (GB)

(73) Assignee: Snell Limited, Reading, Berkshire (GB)

(*) Notice: Subject to any disclaimer, the term of this patent is extended or adjusted under 35 U.S.C. 154(b) by 913 days.

(21) Appl. No.: 12/717,486

(22) Filed: Mar. 4, 2010

(65) Prior Publication Data

US 2010/0225823 A1 Sep. 9, 2010

(30) Foreign Application Priority Data

Mar. 6, 2009 (GB) .................................. 0903905.8

(51) Int. Cl.
*H04B 1/66* (2006.01)
*H04N 5/14* (2006.01)

(52) U.S. Cl.
CPC ............... *H04N 5/142* (2013.01); *H04N 5/147* (2013.01)
USPC .................................................... 375/240.12

(58) Field of Classification Search
CPC ............................... H04N 5/142; H04N 5/147
USPC ..................... 375/240.12; 348/699, E05.062; 382/224
IPC ..................................... H04N 5/14; G06K 9/62
See application file for complete search history.

(56) References Cited

U.S. PATENT DOCUMENTS

| | | | |
|---|---|---|---|
| 5,517,248 A * | 5/1996 | Isoda ............................. | 348/459 |
| 5,734,420 A | 3/1998 | Lee et al. | |
| 6,897,903 B1 | 5/2005 | Hu | |
| 6,922,214 B1 | 7/2005 | Weston | |
| 7,978,265 B2 * | 7/2011 | Chao .............................. | 348/452 |
| 2002/0168091 A1 * | 11/2002 | Trajkovic ...................... | 382/107 |
| 2005/0157943 A1 | 7/2005 | Ruggiero | |
| 2007/0002169 A1 | 1/2007 | Munsil et al. | |
| 2007/0188662 A1 | 8/2007 | Winger et al. | |
| 2007/0296858 A1 | 12/2007 | Eymard et al. | |
| 2008/0106642 A1 | 5/2008 | Srinivasan et al. | |

FOREIGN PATENT DOCUMENTS

| | | | | |
|---|---|---|---|---|
| FR | 293541 A1 * | 6/2010 | ............... | G06K 9/62 |
| WO | 01/13647 A1 | 2/2001 | | |
| WO | 2007125415 A3 | 11/2007 | | |
| WO | 2008/081386 A1 | 7/2008 | | |

OTHER PUBLICATIONS

GB0903905.8 Search Report.

* cited by examiner

*Primary Examiner* — Tung Vo
(74) *Attorney, Agent, or Firm* — Michael Best & Friedrich LLP

(57) ABSTRACT

The temporal sampling pattern of a sequence of images that represents a moving scene is classified into classes of temporal sampling patterns including "film", "video" and "still". Pixels in each image in the said sequence are classified according to the relationship between signed inter-image pixel-value differences f1 and f2 between that image and, respectively, the preceding and succeeding images in the sequence. An initial classification for each pixel may be refined in accordance with the relative numbers of pixels of the image initially classified into each class.

8 Claims, 3 Drawing Sheets

REGIONAL FILM CADENCE DETECTION

RELATED APPLICATION

The present application claims the benefit of prior filed Great Britain Patent Application No. GB0903905.8, filed Mar. 6, 2009, the entire contents of which are hereby incorporated by reference.

FIELD OF THE INVENTION

This invention concerns the analysis of video material to identify the temporal sampling pattern, and, in particular to identify local differences in that pattern within individual temporally-sampled images.

BACKGROUND

Motion imaging systems represent moving images as a sequence of stationary images. These stationary images represent temporal samples of a scene. Different image acquisition technologies use different temporal sampling rates. In a video editing process it is common to combine images acquired at differing temporal sampling rates in the same video presentation. For example a television program may include television images sampled at 59.94 Hz and film material sampled at 24 Hz. The material from the film frames may be presented by repeating film frames in a '3:2 sequence' that comprises a phase-perturbed temporal sampling pattern. These two sampling patterns may occur simultaneously in the same video field or frame—for example in a 'split-screen' effect, or where television-originated captions are 'keyed-into' film-originated images.

Many image-processing techniques combine information from adjacent images in a sequence of images that represents a moving image; such processes include standards-conversion, de-interlacing, noise reduction and aspect-ratio conversion. These processes can be improved by taking into account the temporal sampling patterns of the image pixels in deciding whether to combine information from adjacent temporal samples.

The problem of detecting the temporal sampling pattern is particularly relevant to the processing of interlaced television images that incorporate film material having a frame-rate lower than the television field-rate. The term 'film-cadence', which will be shortened to 'cadence' elsewhere in this specification, is commonly used to describe the temporal relationship between spatially equivalent pixels in preceding and succeeding images in a motion-image sequence. Typically the cadence of a pixel can be assigned to one of three categories:

'Film 1' where the corresponding, succeeding-image pixel corresponds to the same temporal sample, and the corresponding, preceding-image pixel corresponds to a preceding temporal sample;

'Film 2' where the corresponding, preceding-image pixel corresponds to the same temporal sample, and the corresponding, succeeding-image pixel corresponds to a succeeding temporal sample; and, 'Video' where the corresponding, preceding and succeeding pixels correspond respectively to preceding and succeeding temporal samples.

If a pixel corresponds to part of the image sequence that contains no moving objects the cadence is usually irrelevant and cannot be determined by analysis of pixel values. A special additional category of 'Still' pixels may be used to cater for this situation.

European patent EP 1 127 455 describes methods for determining cadence by comparing the absolute magnitudes of inter-field difference signals. These difference signals may be 'corrected' for the presence of detail by subtracting a measure of detail from them prior to the comparison. The present invention provides improved methods of cadence detection which are particularly suitable for detecting relatively small regions within the image having cadence differing from the remainder of the image.

SUMMARY

The invention consists in a method and apparatus that classifies the temporal sampling pattern of a sequence of images that represents a moving image wherein an image in the said sequence is classified according to the relationship between signed inter-image pixel-value differences between that image and the preceding and succeeding images in the sequence.

Suitably, at least part of an image in the sequence is recognized as having one of the following temporal characteristics:
- the succeeding image corresponds to the same temporal sample and the preceding image corresponds to a different temporal sample
- the preceding image corresponds to the same temporal sample and the succeeding image corresponds to a different temporal sample
- the preceding and succeeding images correspond to a different temporal samples.

Advantageously, individual pixels are classified.

In a preferred embodiment the images in the sequence are spatially low-pass filtered and spatially subsampled so as to reduce the number of pixels prior to the derivation of the said signed inter-image pixel difference values, and the subsampled pixels are classified.

Advantageously, the classification of a pixel in an image is modified in dependence upon the classification of other pixels in the same image.

Suitably, the pixels of the said image are assigned to classes according their respective signed inter-image pixel-value differences and the said modification depends on the total number of pixels in the said image assigned to a particular class.

In some embodiments only pixels forming part of a predefined image region are processed.

In one embodiment, the invention provides a method of classifying a temporal sampling pattern of a sequence of images that represents a moving image. An image in the sequence of images has an associated preceding image and an associated succeeding image. The method includes the acts of deriving a preceding inter-image pixel-value difference by subtracting the associated preceding image from the image, deriving a succeeding inter-image pixel-value difference by subtracting the image from the associated succeeding image, and classifying the image in the sequence of images according to a relationship between the preceding inter-image pixel-value difference and the succeeding inter-image pixel-value difference.

In another embodiment the invention provides an apparatus for classifying a temporal sampling pattern of a sequence of images that represents a moving image. The apparatus includes an inter-field difference unit and a classification unit. The inter-field difference unit compares an image in the sequence of images with a preceding image to derive a preceding inter-image pixel-value difference between the image and the preceding image and compares the image in the sequence of images with a succeeding image in the sequence of images to derive a succeeding inter-image pixel-value difference between the image and the succeeding image in the sequence of images. The classification unit classifies each image in the sequence of images according to a relationship between the preceding inter-image pixel-value difference and the succeeding inter-image pixel-value difference.

In another embodiment the invention provides a method of classifying a temporal sampling pattern of a sequence of images that represents a moving scene into a plurality of classes of temporal sampling patterns including "film", "video" and "still." The method includes the acts of initially classifying a plurality of pixels in an image in the said sequence of images according to a relationship between a preceding inter-image pixel-value difference f1 derived from the image and a preceding image and a succeeding inter-image pixel-value difference f2 derived from the image and a succeeding image, and refining an initial classification for each of the plurality of pixels in accordance with a relative number of pixels of the image initially classified into each of a plurality of classes.

In another embodiment the invention provides a computer readable medium including processor-readable instructions for carrying out a method of classifying a temporal sampling pattern of a sequence of images that represents a moving image. The instructions are operable to compare an image in the sequence with a preceding image in the sequence to derive a preceding inter-image pixel-value difference, compare an image in the sequence with a succeeding image in the sequence to derive a succeeding inter-image pixel-value difference, and classify each image in the said sequence according to a relationship between said preceding inter-image pixel-value difference and the succeeding inter-image pixel-value difference.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

The exemplary processing of a video field in order to classify the cadence of regions of the image comprises three stages:
1. Derivation of pixel inter-field differences.
2. Initial classification of pixels according to the respective inter-field differences.
3. Refinement of the classification of each pixel in dependence upon the classification of other pixels in the same field.

Figure 1:
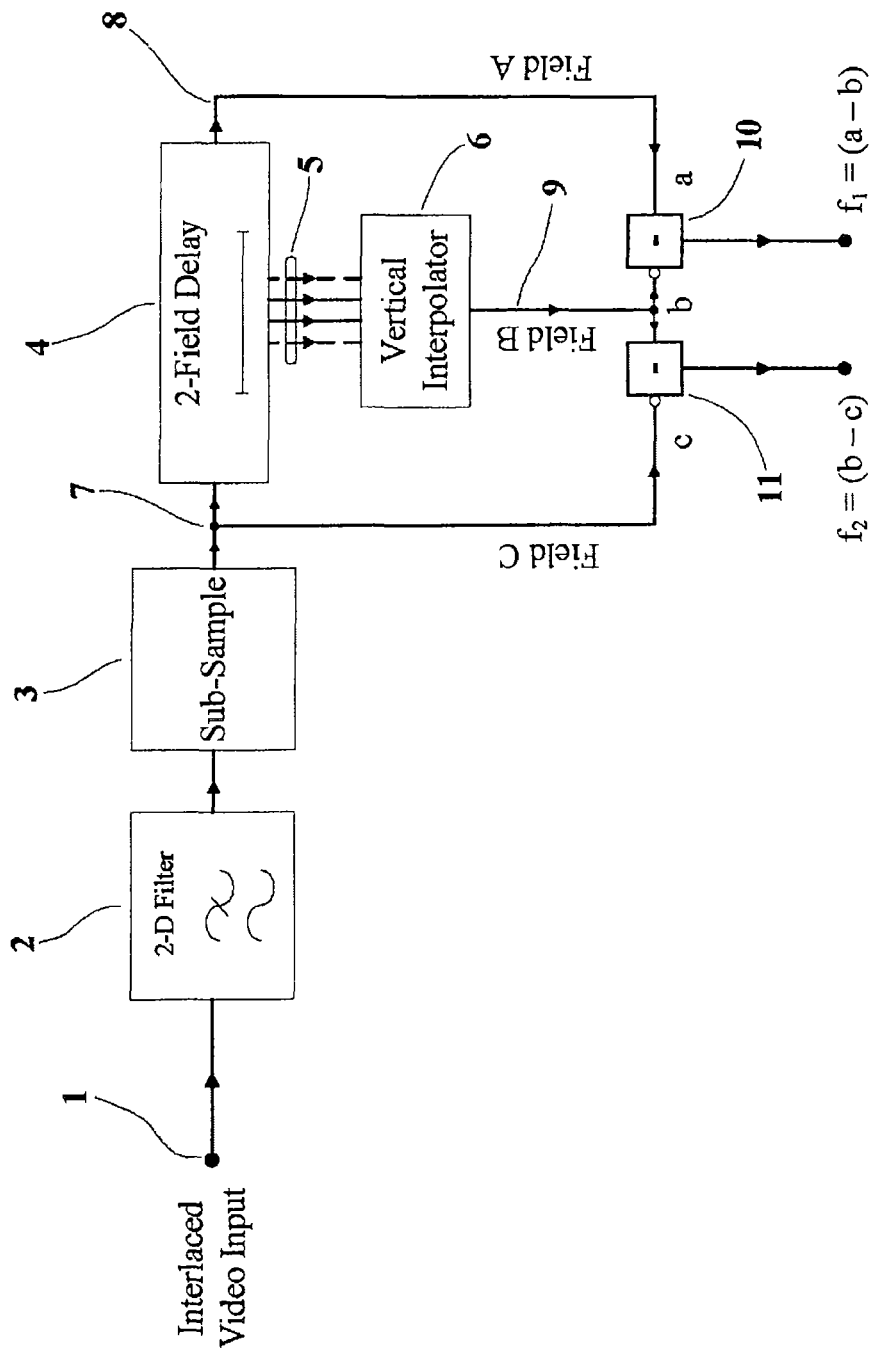
FIG. 1 shows a block diagram of a system for determining inter-field difference values for the pixels of a field of an interlaced video signal.

The first stage is illustrated in FIG. 1, which shows an example of the derivation of inter-image difference signals in a real-time process applied to a conventional, streaming, sampled interlaced television signal. The skilled reader will understand that analogous derivations can be applied in systems that process image data in other formats, including image files and non-interlaced image formats.

The input video signal (1) is applied to an optional spatial low-pass filter (2), which would typically be a two-dimensional filter that reduces the resolution of the image to the required resolution of the cadence data to be derived. The filtered video is optionally spatially sub-sampled in a sampler (3) to reduce the number of pixels that describe each field. The resulting stream of pixels is applied to a tapped, 2-field delay (4) which has a number of intermediate-tap outputs (5) corresponding to delay values close to one field period and equal to integral numbers of television lines. A weighted sum of these intermediate outputs is formed in a vertical interpolator (6).

The stream of pixels (7) at the input to the delay (4) are spatially aligned with the corresponding stream of pixels (8) at the output of the delay (4); however spatially-corresponding pixels represent temporal samples that are two fields apart. The stream of pixels (9) at the output of the vertical interpolator (6) are also spatially aligned with the pixels (7) and (8) in known manner by suitable choice of the summing weights in the vertical interpolator (6); however these pixels are temporally one field later than the pixels (8) and one field earlier than the pixels (7).

If we designate the current pixel (8) as pixel a, being part of Field A, the current pixel (9) as pixel b, being part of Field B, and the current pixel (7) as pixel c, being part of Field C, then we can form two temporal difference signals by subtracting pixel values, which, typically, would be the respective luminance values:

$$f_1 = (a-b)$$

$$f_2 = (b-c)$$

These difference signals are formed by the subtractors (10) and (11).

As explained in the above-cited prior patent, the vertical interpolation could be applied to Field A and to Field C rather than to Field B, or all three fields could be interpolated to a common intermediate vertical position.

In the second stage of the process the cadence of each of the vertically-interpolated pixels (9) of Field B is analyzed by comparing the corresponding f1 and f2 values, which represent the inter-field differences with respect to the co-sited pixels in the earlier Field A and the later Field C respectively. The values for each field are stored and processed as described below to find a cadence for every pixel of every field.

Figure 2:
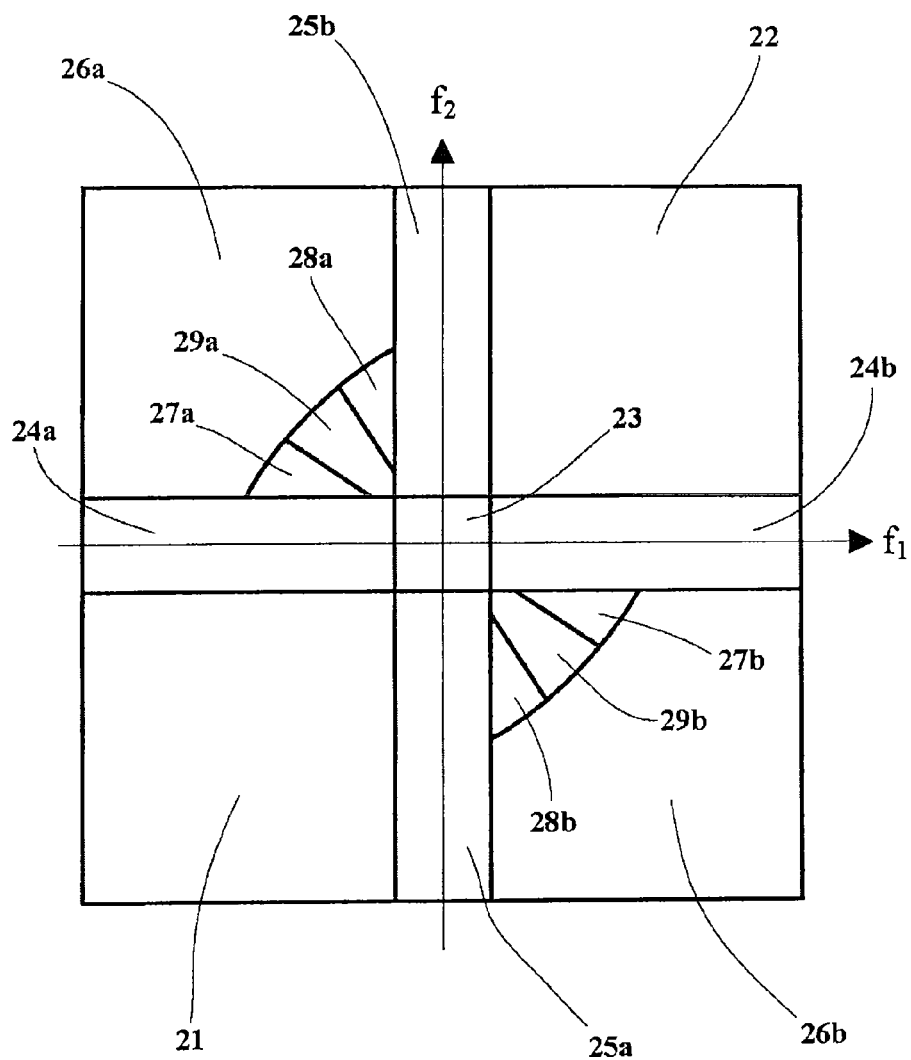
FIG. 2 shows a plot of forward inter-field difference versus backward inter-field difference divided into regions corresponding to cadence types.
Figure 3:
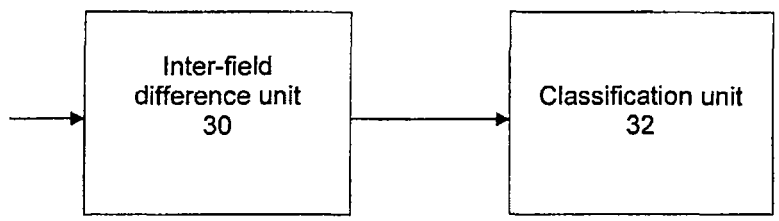
FIG. 3 shows a diagram illustrating the interrelationship between the inter-field difference unit of FIG. 1 and a classification unit operating in accordance with FIG. 2

FIG. 2 shows how a two-dimensional plot of f2 versus f1 for a given pixel may be divided into regions that correspond to particular cadence types. (Note that, in FIG. 2 the regions and the boundaries between regions are shown schematically and not to scale, so as to enable their relationships to be more readily appreciated. The following description defines an exemplary embodiment of this aspect of the invention.)

In any practical system the pixel values will have an upper bound (typically 1,023) and so all pixels will fall within a square region on the plot (assuming equal scales for the f1 and f2 axes). The cadence of a pixel can be inferred from the region, within the square, in which it lies. The correspondence between regions and particular cadence types is as follows:

Film 1 pixels lie close to the $f_1$ axis because Field B and Field C correspond to the same temporal sample. Regions (24a) and (24b).

Film 2 pixels lie close to the $f_2$ axis because Field A and Field B correspond to the same temporal sample. Regions (25a) and (25b).

Video pixels corresponding to slow movement lie in the first quadrant if the pixel values b, and c are monotonically decreasing; or, the third quadrant if the pixel values a, b, and c are monotonically increasing. These will be designated 'Video' pixels. Regions (21) and (22).

Video pixels corresponding to fast movement (objects moving at speeds of several pixels per field, captured by a camera with a short temporal sampling aperture) lie in the regions of the second and fourth quadrants far from the origin. These will be also be designated Video pixels and are likely to be generated by 'shuttered' video cameras having a short temporal sampling aperture. Regions (26a) and (26b).

Pixels corresponding to stationary image content, lacking vertical detail will lie close to the origin. These will be designated 'Still' pixels. Region (23).

Pixels corresponding to film with high levels vertical detail (e.g. closely-spaced horizontal lines) will lie in the second and fourth quadrants, but closer to the origin than the 'shuttered' Video pixels. These will be designated 'alias' pixels. Regions (29a) and (29b).

The f1 and f2 inter-field difference values can be used to determine of the region into which a pixel falls by the following logic:

If $[(f_1<-\delta)$ and $[(f_2<-\delta)]$ then allocate pixel to Video (Region (21)), Otherwise:
If $[(f_1>\delta)$ and $[(f_2>\delta)]$ then allocate pixel to Video, (Region (22)), Otherwise:
If $[(|f_1|\leq\delta)$ and $(|f_2|\leq\delta)]$ then allocate pixel to Still, (Region (23)), Otherwise:
If $[(f_2>-\delta)$ and $(f_2<\delta)]$ then allocate pixel to Film 1, (Regions (24a) and (24b)), Otherwise:
If $[(f_1>-\delta)$ and $(f_1<\delta)]$ then allocate pixel to Film 2, (Regions (25a) and (25b)), Otherwise:
If $[f_1^2+f_2^2-f_1f_2>\Delta]$ then allocate pixel to 'shuttered' Video, (Regions (26a) and (26b)), Otherwise:
If $[|f_2|<\div\alpha)]$ then allocate pixel to Film 1, (Regions (27a) and (27b)), Otherwise:
If $[|f_1|<|f_2|\div\alpha)]$ then allocate pixel to Film 2, (Regions (28a) and (28b)), Otherwise:
Allocate pixel to Alias, (Regions (29a) and (29b)).
Where: |x| designates a magnitude of x; and,
$\delta$, $\Delta$ and $\alpha$ are constants.

The constant $\delta$ defines the size of the square 'still' region (23) and is typically less than one percent of the maximum pixel value. The curved inner boundaries of the regions (26a) and (26b) are sections of an ellipse whose major axis lies along the line defined by the equation f1=f2, and whose size depends on A. The distance between each of these boundaries and the origin is typically about ten percent of the maximum pixel value. The constant $\alpha$ defines the slopes of the boundaries between regions (27) (28) and (29) and typically has a value of the order of 3.

The above initial classification process is applied to every pixel derived from Field B and results in every pixel being assigned to one of five classes:
Video, regions (21), (22), (26a) and (26b);
Film 1, regions (24a), (24b), (27a) and (27b);
Film 2, regions (25a), (25b), (28a) and (28b);
Alias, regions (29a) and (29b); and,
Still, region (23).

In the third stage of the processing, the initial classification of each pixel is refined, taking into account the total membership of each class obtained by summing over all the pixels (9) derived from Field B. The refinement process comprises four parts.

First, if there are fewer Still pixels than Film pixels (both types), and the majority Film cadence has more pixels assigned to it than the number of Still pixels, then those Still pixels are re-assigned to the majority Film cadence:
If $[(\Sigma film_1+\Sigma film_2)>\Sigma still]$ then:
If $\{[\Sigma film_1>\Sigma film_2]$ AND $[\Sigma film_1>\Sigma still]\}$ then assign all Still pixels to Film 1
If $\{[\Sigma film_2>\Sigma film_1]$ AND $[\Sigma film_2>\Sigma still]\}$ then assign all Still pixels to Film 2.
Where: $\Sigma film_1$ is the total number of pixels from Field B initially classified as Film 1;
$\Sigma film_2$ is the total number of pixels from Field B initially classified as Film 2; and,
$\Sigma still$ is the total number of pixels from Field B initially classified as Still.

The second part of the refinement is to test whether there is an unambiguous majority Film cadence, and, if so, to set minority Film cadence Film pixels having small inter-field difference values to the opposite (majority) Film cadence:
If $[\Sigma film_1>(1+\beta)\times\Sigma film_2]$ then:
Re-classify Film 2 pixels for which $|f_2|<\gamma$ to Film 1.
If $[\Sigma film_2>(1+\beta)\times\Sigma film_1]$ then:
Re-classify Film 1 pixels for which $|f_1|<\gamma$ to Film 2.
Where: $\beta$ and $\gamma$ are positive constants.

$\beta$ is typically about ten percent of the maximum pixel value, and $\gamma$ is typically about five percent of the maximum pixel value.

The third part of the refinement is to re-classify isolated pixels that are differently classified from their neighbors in dependence upon the classes of the neighboring pixels. For each pixel there are eight such neighboring pixels and the re-classification logic is as follows:

For Alias pixels there are two conditions that lead to re-classification:
If there are two or more Video neighbors, and two or less Film neighbors (including both Film 1 and Film 2) then the pixel is re-classified as Video; and,
If there is one Video neighbor and no Film neighbors (including both Film 1 and Film 2) then the pixel is also re-classified as Video.

For Video pixels there is one condition that leads to re-classification:
If there are no Video neighbors then the pixel is re-classified as Alias.

For Film 1, Film 2, and Still pixels there is one condition that leads to re-classification:
If there are seven or more video neighbors then the pixel is re-classified as Video.

Note that the above re-classification processes are not recursive; the re-classification decisions are made using the classification results for the neighboring pixels as determined at the end of the second part of the refinement process.

The fourth and final part of the refinement is to assign the Alias pixels (which represent aliased film) to the majority film cadence:
If $[\Sigma film_1 \geq \Sigma film_2]$ then re-classify Alias pixels to Film 1, otherwise:
Re-classify Alias pixels as Film 2.
All pixels have now been classified as Video, Film 1, Film 2, or Still.

There are a number of variations possible within the scope of the invention. For example either the initial low-pass filtering or the spatial sub-sampling process may be omitted; and, some or all of the refinement processes may be omitted. If metadata giving information about the images or the objects represented by the pixels is available then it may be used to improve the refinement process.

Typically luminance values of pixels are used in the processing, but other values, including multi-dimensional values (such as Red, Green Blue, or Hue, Saturation, Lightness) could be used, provided a suitable numerical measure of the inter-image difference between spatially co-sited pixels can be obtained.

It is sometimes helpful to ignore pixels close to the edges of the images because they may be distorted as a result of filtering processes. And, in real-time processing, it is sometimes helpful to ignore pixels towards the bottom of the image so as to gain time to carry out processing before the next image arrives.

The invention can be applied to non-interlaced image sequences, but this is a simpler problem to solve because stationary vertical detail does not produce the same inter-image differences as motion. This means that the Alias categories, regions (29a) and (29b), are not required.

What is claimed is:

1. An apparatus for classifying a temporal sampling pattern of a sequence of images that represents a moving image, wherein each image in the sequence is formed of a plurality of pixels, the apparatus comprising:
    an inter-field difference unit in which each pixel of a plurality of pixels in an image in the sequence of images is compared with a corresponding pixel in a preceding image to derive a preceding inter-image pixel-value difference between the image and the preceding image and each pixel of said plurality of pixels in the image in the sequence of images is compared with a corresponding pixel in a succeeding image in the sequence of images to derive a succeeding inter-image pixel-value difference between the image and the succeeding image in the sequence of images; and
    a classification unit in which each pixel of a plurality of pixels in each image in the sequence of images is initially classified according to a relationship between the preceding inter-image pixel-value difference and the succeeding inter-image pixel-value difference; and said initial classification refined for each of the plurality of pixels in accordance with a relative number of pixels of the image initially classified into each of a plurality of classes, wherein the plurality of classes of temporal sampling patterns include:
    a film 1 where the preceding image corresponds to a same temporal sample as the image and the succeeding image corresponds to a different temporal sample than the image;
    a film 2 where the succeeding image corresponds to the same temporal sample as the image and the preceding image corresponds to a different temporal sample than the image;
    a video where the preceding image corresponds to a different temporal sample than the image and the succeeding image corresponds to a different temporal sample than the image; and
    a still where the preceding image and the succeeding image corresponds to the same temporal sample as the image.

2. An apparatus according to claim 1, wherein the inter-field difference unit includes a sub-sampler to spatially sub-sample a plurality of pixels of the sequence of images so as to reduce a number of pixels, wherein the classification unit serves to classify a plurality of sub-sampled pixels.

3. An apparatus according to claim 1 wherein the inter-field difference unit includes a filter in which the sequence of images are spatially low-pass filtered prior to the derivation of the preceding inter-image pixel-value difference and the succeeding inter-image pixel-value difference.

4. An apparatus according to claim 1, wherein only a pre-defined region of the image, the preceding image, and the succeeding image is used to derive the preceding inter-image pixel-value difference and the succeeding inter-image pixel-value difference.

5. A method classifying a temporal sampling pattern of a sequence of images that represents a moving scene into a plurality of classes of temporal sampling patterns including film, video, still, the method comprising:
    initially classifying a plurality of pixels in an image in the said sequence of images according to a relationship between a preceding inter-image pixel-value difference f1 derived from the image and a preceding image and a succeeding inter-image pixel-value difference f2 derived from the image and a succeeding image; and
    refining an initial classification for each of the plurality of pixels in accordance with a relative number of pixels of the image initially classified into each of a plurality of classes, wherein the plurality of classes of temporal sampling patterns include:
    a film1 where the preceding image corresponds to a same temporal sample as the image and the succeeding image corresponds to a different temporal sample than the image;
    a film 2 where the succeeding image corresponds to the same temporal sample as the image and the preceding image corresponds to a different temporal sample than the image;
    a video where the preceding image corresponds to a different temporal sample than the image and the succeeding image corresponds to a different temporal sample than the image; and
    a still where the preceding image and the succeeding image corresponds to the same temporal sample as the image.

6. A method according to claim 5, wherein the plurality of pixels in each image in the said sequence are initially classified into one of the plurality of classes including: the film 1; the film2; the video; the still; and a alias.

7. A method according to claim 6, wherein the plurality of pixels are initially classified according to
    If $[(f_1 < -\delta)$ and $[(f_2 < -\delta)]$ then allocate pixel to Video, otherwise:
    If $[(f_1 > \delta)$ and $[(f_2 > \delta)]$ then allocate pixel to Video, otherwise:
    If $[(|f_1| \leq \delta)$ and $(|f_2| \leq \delta)]$ then allocate pixel to Still, otherwise:
    If $[(f_2 > -\delta)$ and $(f_2 < \delta)]$ then allocate pixel to Film 1, otherwise:
    If $[(f_1 > -\delta)$ and $(f_1 < \delta)]$ then allocate pixel to Film 2, otherwise:
    If $[F(f_1, f_2) > \Delta]$ then allocate pixel to Video, otherwise:
    If $[|f_2| < \div \alpha)]$ then allocate pixel to Film 1, otherwise:
    If $[|f_1| < |f_2| \div \alpha)]$ then allocate pixel to Film 2, otherwise allocate to pixel Alias
    wherein: $|x|$ designates the magnitude of x: $\delta$, $\Delta$, and $\alpha$ are constants and $F(f_1, f_2)$ is a polynomial function of $f_1$ and $f_2$.

8. A non-transitory computer readable medium including processor-readable instructions for carrying out a method of classifying a temporal sampling pattern of a sequence of images that represents a moving image, wherein each image in the sequence is formed of a plurality of pixels, the instructions operable to:

compare each pixel of a plurality of pixels in an image in the sequence with a corresponding pixel in a preceding image in the sequence to derive a preceding inter-image pixel-value difference;

compare each pixel of a plurality of pixels in the image in the sequence with a corresponding pixel in a succeeding image in the sequence to derive a succeeding inter-image pixel-value difference;

classify each pixel of said plurality of pixels in each image in the said sequence according to a relationship between said preceding inter-image pixel-value difference and the succeeding inter-image pixel-value difference; and refining an initial classification for each of the plurality of pixels in accordance with a relative number of pixels of the image initially classified into each of a plurality of classes, wherein the plurality of classes of temporal sampling patterns include:

a film1 where the preceding image corresponds to a same temporal sample as the image and the succeeding image corresponds to a different temporal sample than the image;

a film 2 where the succeeding image corresponds to the same temporal sample as the image and the preceding image corresponds to a different temporal sample than the image;

a video where the preceding image corresponds to a different temporal sample than the image and the succeeding image corresponds to a different temporal sample than the image; and a still where the preceding image and the succeeding image corresponds to the same temporal sample as the image.

* * * * *